Dec. 19, 1939.  H. C. WELLMAN  2,183,521
MOTION PICTURE APPARATUS
Filed March 6, 1937
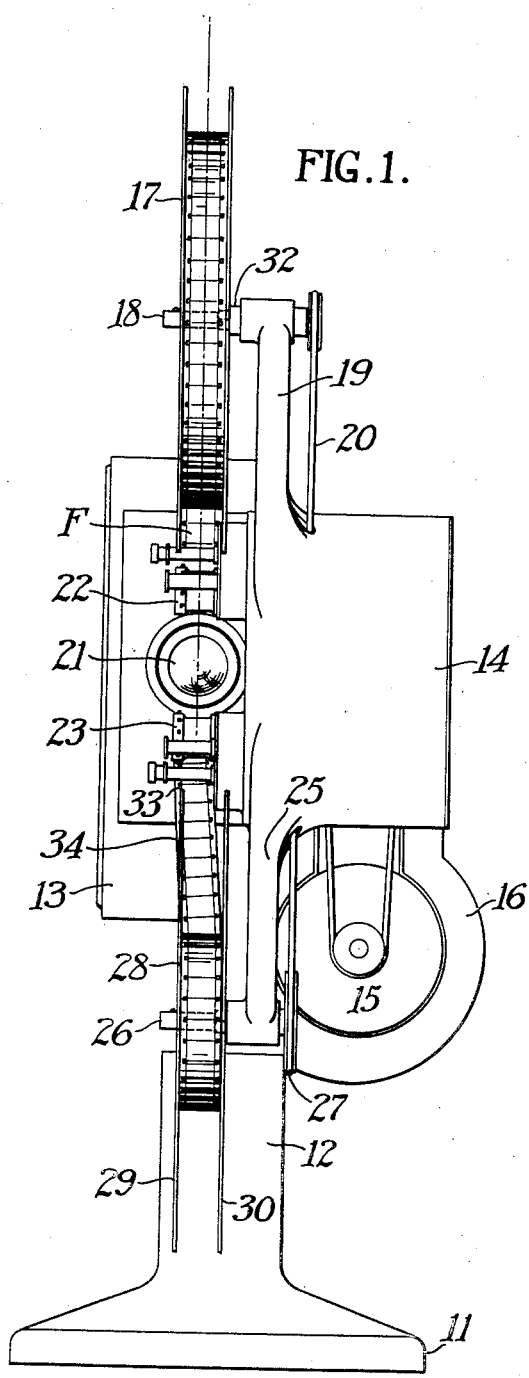
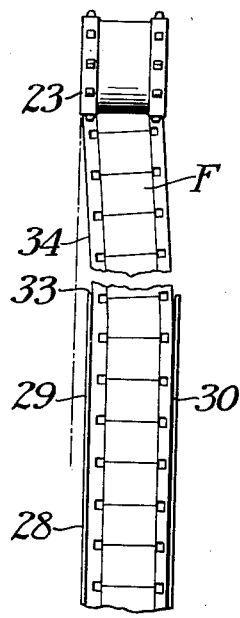
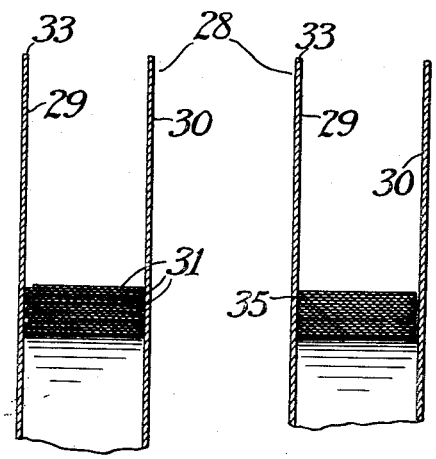
Howard C. Wellman
INVENTOR.
BY
ATTORNEYS Patented Dec. 19, 1939

2,183,521

UNITED STATES PATENT OFFICE 2,183,521

MOTION PICTURE APPARATUS

Howard C. Wellman, Rochester, N. Y., assignor to Eastman Kodak Company, Rochester, N. Y., a corporation of New Jersey Application March 6, 1937, Serial No. 129,416

9 Claims. (Cl. 242—55)

The present invention relates to motion picture apparatus, and more particularly to an arrangement by which the film strip is guided onto a take-up reel so as to insure smooth and tight winding of the film strip thereon.

In motion picture apparatus, particularly projectors adapted for use by amateurs, it is highly desirable that the film strip or band be wound evenly and tightly upon the take-up reel. If the film strip has developed a curl, or if the film reel has become bent or distorted in use, the moving film strip will sway from side to side and will not be so wound.

The present invention overcomes these objectionable features by slightly offsetting the take-up reel so that the film is fed at a slight angle thereto. By means of this arrangement, the rim of the reel flange lies in the path of the moving strip and engages an edge thereof to slightly tension the edge. This slight tension causes the edge to tightly hug the near flange of the reel and thus insure tight and smooth winding of the film strip thereon.

The principal object of the invention is the provision of a take-up reel arrangement which insures that the film strip will be tightly wound thereon.

Another object of the invention is the provision of such a reel arrangement which is effective in reducing the noise incident to the feeding of a film strip onto a take-up reel.

Still another object of the invention is the provision of such a reel arrangement which can be readily adapted to existing machines.

A further object of the invention is the provision of such a reel arrangement which is simple in construction, inexpensive to manufacture, and highly effective in use.

To these and other ends, the invention resides in certain improvements and combinations of parts, all as will be hereinafter more fully described, the novel features being pointed out in the claims at the end of the specification.

In the drawing:

Fig. 1 is a front elevation view of a motion picture projector showing the take-up reel arrangement constructed in accordance with the present invention.

Fig. 2 is a detailed view on a larger scale than Fig. 1, showing the off center arrangement of the take-up reel.

Fig. 3 is a sectional view taken through a take-up reel wound in the usual manner.

Fig. 4 is a view similar to Fig. 3 showing the arrangement of the film strip on the take-up reel when wound in accordance with the manner set forth in the present invention.

The same reference numerals throughout the several views indicate the same parts.

The present invention is embodied in the present instance, by way of illustration, in a motion picture projector which comprises, in general, a base 11 formed with a pedestal 12 which supports a lamphouse 13 and a casing 14 in which the driving mechanism is arranged. A motor 15 supplies the motive force for operating the various mechanisms, while a fan 16, driven by the motor 15, supplies a blast of cool air for cooling and ventilating the lamphouse. A flanged supply reel 17 is mounted on and rotatable with a spindle 18 which is carried by the upper end of the arm 19 which extends upwardly from the casing 14.

Power is supplied to the spindle 18 by means of a spring belt 20. A projecting lens 21 is mounted on the front of the lamphouse 13 while feed sprockets 22 and 23 are mounted on the side of the casing 14. Sprockets 22 and 23 are arranged on opposite sides of the lens 21, and are driven by suitable mechanisms housed within the casing 14. The reel 17, lens 21, and the sprockets 22 and 23 may be in alignment, as is well known. All of the above mechanisms may be of a standard or any well-known construction and do not constitute a part of the present invention.

The casing 14 is also provided with a depending arm 25 in the lower end of which the take-up spindle 26 is rotatably mounted. This spindle is parallel to the axis of rotation of the sprocket 23. Power is supplied to drive the spindle 26 through the spring belt 27. The take-up reel 28, similar in construction to the reel 17, is mounted on and rotatable as a unit with the spindle 26. The reel 28 is formed with side flanges 29 and 30 between which the film strip F is arranged to be fed, the flanges being spaced a distance approximating the width of the film strip F. This construction is somewhat similar to the support and drive for the supply reel 17, differing slightly therefrom in a manner to be later described.

It is well known to those in the art that motion picture film strips tend to curl. It is also well known that film reels often become distorted or bent in use. When such curled film is fed through a motion picture machine, such for example as a projector, and onto a take-up reel, the film strip tends to sway or oscillate from side to side. This swaying of the film strip causes the latter to wind onto the take-up reel so that the different convolutions of the film strip are arranged in a haphazard and staggered relation, as illustrated at 31, Fig. 3. When the film strip is wound in this manner, it will not be drawn tightly around the reel core, thus resulting in a loosely wound reel, the disadvantages of which are obvious to those in the art. Distorted reels also tend to produce this loose winding on the take-up reel.

In order to overcome this difficulty, the present invention provides a novel arrangement for guiding the film strip onto the take-up reel in such a manner that the various convolutions of the strip will be arranged in an orderly manner and will be drawn tightly around the reel core to provide a neat and tightly wound reel. To secure this desirable result, the present invention provides means for slightly tensioning one edge of the moving film strip so as to cause the latter to hug one side of the take-up reel, in a manner to be presently described.

This edge tensioning is accomplished, in the preferred embodiment, by slightly offsetting the take-up reel 28 with respect to the reel 17 or axially relative to the feed sprocket 23, as illustrated in Figs. 1 and 2. It has been found that sufficient offset can be secured by merely omitting the boss or hub which is interposed between the film reel and the supporting arm therefor as it is only necessary to offset a small fraction of an inch. Such a boss is shown at 32 between the supply reel 17 and its supporting arm 19. Referring to Fig. 1, it is seen that by the omission of this boss on the arm 25, the take-up reel 28 may be offset axially slightly to the right (in Fig. 1) so as to be slightly out of alignment with the feed sprocket 23, as indicated somewhat enlarged in Fig. 2.

With the take-up reel 28 thus offset axially, the film strip F is fed or directed by the sprocket 23 toward the take-up reel 28 and at a slight angle thereto, as clearly illustrated in Fig. 2. By reason of this slight angular or offset feeding of the strip F, the rim 33 of the rear flange 29 will lie in the path of the strip and will thus engage the marginal edge 34 thereof to slightly tension and guide the latter. This tension on the edge 34 of the film strip causes the edge to hug the flange 29 of the take-up reel so that the successive convolutions of the film strip are wound evenly and tightly on the reel, as shown at 35, Fig. 4. Furthermore, the engagement of the rim 32 with the film edge greatly reduces the noise which is inherent in the usual method of feeding and winding the film onto a take-up reel.

It is apparent that while the film strip is fed at an angle to the take-up reel, the portion of the film strip between the take-up reel and the sprocket 23 lies substantially in a plane. Furthermore, while this angular feeding of the film strip causes the edge of the latter to engage the rim 33 of the flange 29, the pressure exerted by this rim on the film edge is not sufficient to be detrimental to the film strip or to cause any appreciable wear thereof.

While the reels 17 and 28 have been designated as supply and take-up reel respectively, these terms are merely relative depending on the direction of movement of the film strip. It is apparent when the film is being rewound from the reel 28 to the reel 17, the former may be considered as a supply reel and the latter as the take-up reel. For this reason, either of the reels 17 and 28 may be broadly considered as the take-up reel.

In such rewinding, it is also highly desirable that the film be wound tightly on the upper reel 17. To secure this advantageous feature, the film strip is also preferably fed from the lower reel 28 to the upper reel 17 and at an angle to the latter, much in the manner illustrated in Fig. 2. Referring now to Fig. 1, the upper reel 17 is shown in alignment with the lens 21 and the sprockets 22 and 23, while the lower reel 28 is offset axially relative thereto. Thus the amount of offset between the reels 17 and 28 is the same as that between the sprocket 23 and the reel 28.

With such an arrangement of reels, the film strip will also be rewound onto the reel 17 in the manner above described, so as to insure a smoothly and tightly wound reel. It is contemplated, however, that the upper reel 17 may also be offset axially relative to the lens 21 and sprockets 22 and 23. In such case, the amount of offset of the reel 17 is preferably different than that of the reel 28 so that the latter will be out of alignment with the upper reel 17, for the reason pointed out above.

It is apparent from the above description that the present invention provides a novel winding arrangement by which the film strip is wound tightly and evenly upon the take-up reel. Furthermore, the slight pressure inserted by the rim 33 on the film edge slightly tensions the latter and thus greatly reduces the noise which usually accompanies the reeling or winding of a curled film onto a take-up reel.

While only one embodiment of the invention has been disclosed, it is to be understood that the inventive idea may be carried out in a number of ways. This application is, therefore, not to be limited to the precise details described, but is intended to cover all variations and modifications thereof that fall within the spirit of the invention and the scope of the appended claims.

What I claim is:

1. In a motion picture apparatus, a driven film supporting reel, a spindle on which said deel is mounted in a definite position, and driven film directing and feeding means rotatable about and concentric with an axis which is parallel to the axis of said spindle, said means being offset axially relative to said reel so as to direct a film strip at an angle onto said reel in said position.

2. In a motion picture apparatus, a driven film supporting reel, a spindle on which said reel is mounted in a definite position, and a cylindrical film directing member rotatably mounted on an axis parallel to said spindle, the center of said member being offset axially from the center of said reel so that said member may feed a film strip at an angle onto said reel in said position.

3. In a motion picture apparatus, a driven film supporting reel, a spindle on which said reel is mounted in a definite position, and driven film directing means rotatably mounted on and concentric with an axis which is parallel to the axis of said spindle, said means being offset axially relative to said reel so as to feed a film strip along a single plane between said means and said reel and at an angle to the latter in said position.

4. In a motion picture apparatus, a driven film supporting reel, a spindle on which said reel is mounted in a definite position, and a film engaging member rotatably mounted on an axis parallel to said spindle and having a cylindrical surface arranged to engage a film strip to propel the latter, the center of said member being offset axially from the center of said reel so that said member will propel said strip toward said reel and at an angle to the latter in said position.

5. In a motion picture apparatus, a driven film supporting reel formed with spaced flanges, a spindle on which said reel is mounted, and a film engaging sprocket wheel rotatably mounted on an axis parallel to said spindle and arranged to propel a film strip having a width approximating the distance between said flanges, the center line of said reel being offset axially from the center line of said sprocket so that the film strip will be fed at an angle to said reel so as to hug one of said flanges.

6. In a motion picture apparatus, a driven film supporting reel formed with spaced flanges, a spindle on which said reel is mounted, positively driven means for directing a film strip along one plane only toward said reel, the center line of said means being offset axially from the center line of said reel so that the strip is fed at an angle to said reel, and means associated with said reel and arranged to engage an edge of said film strip to tension said edge so that it will hug one of said flanges.

7. In a motion picture apparatus, a driven film supporting reel formed with spaced flanges, a marginal rim on one of said flanges, a spindle on which said reel is mounted, and a positively driven film feeding and engaging member rotatably mounted on an axis parallel to said spindle and arranged to feed a film strip toward said reel, said strip having a width approximating the distance between said flanges, said reel being so positioned relative to said member that said rim lies in the path of said strip and is arranged to positively engage an edge of said strip to tension said edge so that the latter will hug said one flange to insure tight winding of the strip on said reel.

8. In a motion picture apparatus, a driven film supporting reel formed with spaced flanges, a spindle on which said reel is mounted, a film feeding member rotatably mounted on and concentric with an axis parallel to said spindle, said member feeding a film strip toward said reel, said reel being offset axially with respect to said member, and a peripheral rim on one of said flanges arranged to positively engage and tension an edge of said strip to force the edge to hug said flange to insure tight winding of said strip on said reel.

9. In a motion picture apparatus, a driven film supporting reel formed with spaced flanges, a spindle on which said reel is mounted, a sprocket wheel arranged to engage a film strip and to propel the latter toward said reel, said strip having a width approximating the distance between said flanges, said sprocket being offset axially with relation to said reel, and a rim on one of said flanges positioned in the path of said strip so that said rim will engage an edge of said strip to tension the latter to cause said strip to hug said flange to insure tight winding of the strip on said reel.

HOWARD C. WELLMAN.